Patented Aug. 13, 1940

2,211,411

UNITED STATES PATENT OFFICE 2,211,411

METHOD OF ISOLATING AND PURIFYING THE LACTOGENIC HORMONE

Everett I. Evans, Washington, D. C.

No Drawing. Application November 8, 1937, Serial No. 173,428

4 Claims. (Cl. 167—74)

The present invention relates to lactogenic hormone and more particularly to an improved method for preparing a lactogenic product of high unitary value or potency.

It has been known for some time that the anterior lobe of the pituitary gland obtained for example from animals such as cattle, sheep or pigs, was the source of lactogenic hormone. Previous attempts, however, to isolate the lactogenic hormone, which chemically has been identified as a complex protein, have not been for the most part satisfactory. For example, it has been found by following the prior methods consisting in extraction in an aqueous acid medium, and precipitation at the iso-electric point, followed by tedious chemical purifications, that the yields were low and the final product obtainable was not of desired potency for clinical use. The products obtained by prior methods contained a large percentage of impurities of a complex chemical nature and contained only about 6 to 8 units per mg. of the desired lactogenic hormone.

It is, therefore, the principal object of my invention to provide a method of isolating the lactogenic hormone so that the final product will be substantially free from impurities and have a high lactogenic potency.

Other objects will be apparent as the description hereinafter proceeds.

I have discovered after extended investigation that by adding an aqueous solution containing an alkaline earth salt, such as calcium chloride to the extract obtained from the anterior lobe of the pituitary gland that most of heretofore inseparable impurities precipitate and leave the lactogenic hormone dissolved in the supernatant liquid. Although the voluminous precipitate formed on the addition of the water soluble alkaline earth salt contains about 95 percent of the original protein present in the pituitary extract, it contains no lactogenic hormone.

I have also discovered that better yields of the lactogenic hormone are obtained when the pituitary gland is subjected to repeated extractions using an aqueous alkaline medium of a concentration considerably higher than hitherto employed. In my preferred process the extraction is carried out in the cold i. e. 1° to 5° C., using a 0.05 to 0.1 normal caustic soda solution, although if desired, a stronger solution may be employed.

After completing the extraction the liquid extract should preferably be cooled on ice and neutralized to a pH value of about 8.2 with a dilute acid e. g. 0.05 normal HCl. The extract is then brought to room temperature (without heating). The extract is then ready for the addition of the alkaline earth salt. In my preferred procedure, I employ a 1 molar $CaCl_2 \cdot 2H_2O$ aqueous solution and add the solution drop-wise, with stirring to the extract. The precipitate formed may be separated from the liquid containing the lactogenic hormone in usual manner.

In my preferred process I add sodium chloride to about 3 percent total concentration to the liquid containing the lactogenic hormone before adding sufficient dilute acid e. g. 0.05 normal HCl, to bring the pH value of the liquid down to the iso-electric point which is about pH 5. Upon adjusting the pH value of the liquid to about 5, a precipitate forms which contains about 90 percent of the lactogenic hormone. This product in dry state contains about 6 to 15 units of the lactogenic hormone per mg. This product may be purified and separated from small amounts of other pituitary hormones by re-precipitation at the same pH value.

The product may be further purified by the ordinary alcoholic fractionations so that the final product contains about 33 units per mg. of lactogenic hormone. The final product is a substantially pure white amorphous powder that has a tendency towards heat unstableness. Analysis has shown the final product to be a complex protein rich in tryptophane and containing some cystine.

If desired, the small amount of lactogenic hormone remaining in the liquid after precipitation may be recovered by adding sufficient salt (NaCl) to bring the total amount to 4.5 percent and then lowering the pH value to about 4.3 by the addition of dilute acid. The precipitate obtained contains about 0.5 to 1 unit per mg. of lactogenic hormone. Further salting of the remaining liquid with an additional 1.5 percent of salt coupled with the lowering of the pH value to about 3, produces a precipitate rich in gonadotropic hormones but containing no lactogenic hormone.

The following specific example will serve for illustrative purposes:

Fresh beef pituitaries are frozen immediately after removal at the abattoir, and are shipped to the laboratory in dry ice where the anterior lobes are separated in the usual manner.

About 200 grams of the anterior pituitary bodies are then ground in a meat grinder which has been previously chilled, and the ground material immediately stirred into 800 cc. of 0.05 normal sodium hydroxide solution cooled to around 5° C. The vessel containing the mixture is immersed in an ice bath, and the material is stirred rapidly for about 2½ hours. The glandular material is then removed from the solution in a centrifuge and is re-extracted twice with 800 cc. portions of cold 0.05 normal sodium hydroxide solution. The clear extracting fluid from each extraction is immediately brought to a pH value of 8.0 to 8.3 with cold 0.05 normal hydrochloric acid.

For each 1000 cc. of the combined extracts of the ground glands, 40 cc. of molar calcium chloride solution is added slowly (drop-wise) with rapid stirring. The pH value will drop to around 7.3 to 7.5. The solution is allowed to stand for about ½ hour and is then centrifuged to remove the protein-calcium precipitate which may be discarded. About 30 grams of sodium chloride dissolved in a small amount of distilled water is then added to each liter of the supernatant fluid. The solution is next brought to a pH value of about 4.9 as determined by the glass electrode with hydrochloric acid, and is allowed to stand in the ice-box for about ½ hour. The white precipitate which appears is separated by the centrifuge and is treated with acetone to remove the haematin. The haematin is dissolved by the acetone and the precipitate may be recovered by centrifugation in the usual manner. This precipitate which assays from 6 to 15 units in lactogenic hormone per milligam may be dried or put in solution by dissolving in a solution of hydrochloric acid at a pH between 2.0 and 3.0. As soon as the material is dissolved, the solution is rapidly brought to a pH value of about 8.0 with 0.05 normal sodium hydoxide.

The remaining lactogenic hormone may be recovered as follows: To the supernatant liquid from the precipitate recovered at pH 4.9 is added 15 grams of sodium chloride per liter, the sodium chloride being dissolved in the required amount of distilled water. The pH value is then adjusted to about 4.3 to 4.45 as determined by the glass electrode, and the liquid chilled in an ice-box for about one-half hour. The precipitate which settles out is collected by centrifugation and washed with acetone. This precipitate assays from 0.5 to 1.0 unit of lactogenic hormone per milligram and may be dried or dissolved by the same method used for dissolving the precipitate recovered at pH 4.9.

If desired, other valuable hormone products may be recovered as follows: The supernatant liquid from the pH 4.3 precipitation is treated with 15 grams of sodium chloride per liter and then brought to a pH of 3.0 to 3.1 with dilute hydrochloric acid. The white precipitate which settles out may be recovered in the usual manner, and dried with acetone. This precipitate contains no lactogenic hormone but is rich in gonadotropic hormones.

My improved process provides a method of isolating a lactogenic product of desired potency for clinical use. My process also provides a means for recovering substantially all of the lactogenic hormone present in the pituitary extract.

My product has several medicinal uses, one of the most important at the present time being its use for stimulating lactation in both animals and humans. This use is particularly urgent in view of the ever-increasing number of young mothers unable to feed their new born off-spring.

Although I have illustrated my invention with specific examples, it will be understood that my invention is not limited thereto. For example, in place of calcium chloride, I may employ other water soluble salts of the alkaline earth metals including salts of barium, strontium, etc. In addition, it will be understood by those skilled in the art that in carrying out my improved process it is not necessary to separate the anterior lobe from the rest of the pituitary gland. However, as the anterior lobe is the source of the desired lactogenic hormone it is ordinarily preferred to limit the extraction to the ground anterior lobe. All modifications coming within the true spirit and scope of my invention are intended to be covered by the claims annexed hereto.

I claim:

1. The method of preparing a lactogenic hormone product of high unitary value which comprises subjecting the anterior lobe of the pituitary gland of animals to repeated extractions with about a 0.05 to 0.1 normal aqueous caustic soda solution while keeping the temperature down to about 1° to 5° C., lowering the pH value of the extract to about 8.2 by addition of dilute acid while cooling with ice, adding a 1 molar calcium chloride solution to the extract after it reaches room temperature, separating the supernatant liquid from the precipitate formed upon the addition of the alkaline earth, adding sodium chloride to the liquid to a concentration of about 3 percent, adding sufficient dilute acid to bring the pH value of the liquid down to about 5, separating the precipitate rich in lactogenic hormone formed upon addition of the acid, reprecipitating the precipitate at a pH value of about 5 and subjecting the precipitate to further purification by alcoholic fractionations.

2. The steps in the method of preparing a substantially pure lactogenic product which comprises subjecting the pituitary gland of animals to extractions with an aqueous caustic soda solution, adjusting the pH value of the alkaline extract thus obtained to about 8.0–8.3 by addition of dilute acid, precipitating the non-lactogenic proteins contained in the extract by addition of an aqueous solution containing a water soluble calcium salt, separating the supernatant liquid containing the lactogenic hormone from the precipitate formed upon addition of the calcium salt, precipitating the lactogenic hormone contained in the liquid by adding sufficient acid to bring the pH value of the liquid down to about 5, i. e. the iso-electric point, and recovering the lactogenic precipitate formed upon addition of the acid.

3. The steps in the method of preparing a substantially pure lactogenic product which comprises subjecting the pituitary gland of animals to extractions with an aqueous alkaline solution, adjusting the pH value of the alkaline extract thus obtained to about 8.0–8.3 by addition of dilute acid, precipitating the non-lactogenic proteins contained in the extract by addition of an aqueous solution containing a water soluble alkaline earth salt and separating the supernatant liquid containing the lactogenic hormone from the non-lactogenic precipitate formed upon addition of the alkaline earth salt.

4. The steps in the method of preparing a lactogenic hormone product of high unitary value which comprises subjecting the pituitary gland of animals to extractions with an aqueous alkaline solution, adjusting the pH value of the alkaline extract thus obtained to about 8, precipitating the non-lactogenic proteins contained in the extract by addition of calcium chloride and separating the supernatant liquid containing the lactogenic hormone from the non-lactogenic precipitate formed upon addition of the calcium chloride.

EVERETT I. EVANS.